(12) United States Patent
Fliegl

(10) Patent No.: US 8,449,014 B2
(45) Date of Patent: May 28, 2013

(54) VEHICLE WITH COVER ARRANGEMENT FOR THE LOAD BODY

(76) Inventor: Josef Fliegl, Töging (DE)

( * ) Notice: Subject to any disclaimer, the term of this patent is extended or adjusted under 35 U.S.C. 154(b) by 180 days.

(21) Appl. No.: 13/197,012

(22) Filed: Aug. 3, 2011

(65) Prior Publication Data

US 2012/0043782 A1 Feb. 23, 2012

(30) Foreign Application Priority Data

Aug. 20, 2010 (DE) .................... 20 2010 008 320 U

(51) Int. Cl.
*B60P 7/02* (2006.01)
(52) U.S. Cl.
USPC .................................................... 296/100.02
(58) Field of Classification Search
USPC ............. 296/100.02, 107.07, 107.08, 107.09, 296/107.17, 108, 210, 223, 121, 220.01; 224/310
See application file for complete search history.

(56) References Cited

U.S. PATENT DOCUMENTS

| | | | | |
|---|---|---|---|---|
| 1,158,138 A | * | 10/1915 | Luedinghaus, Jr. | 298/25 |
| 1,333,464 A | * | 3/1920 | Christophersen | 105/377.06 |
| 2,166,846 A | * | 7/1939 | McCalley | 414/509 |
| 2,408,132 A | * | 9/1946 | Weeks | 296/223 |
| 3,009,426 A | * | 11/1961 | Nampa | 410/47 |
| 3,069,199 A | * | 12/1962 | Reardon et al. | 296/100.07 |
| 3,790,207 A | * | 2/1974 | Anderson | 296/164 |
| 3,858,744 A | * | 1/1975 | Garvert | 217/60 G |
| 3,861,737 A | * | 1/1975 | Kirkbride | 296/100.18 |
| 4,210,358 A | * | 7/1980 | Sweet et al. | 296/100.1 |
| 4,268,084 A | * | 5/1981 | Peters | 296/148 |
| 4,302,044 A | * | 11/1981 | Sims | 296/186.4 |
| 4,542,931 A | * | 9/1985 | Walker, Jr. | 296/100.1 |
| 4,627,658 A | * | 12/1986 | Vold et al. | 296/100.1 |
| 4,767,152 A | * | 8/1988 | Stluka et al. | 296/100.1 |
| 6,079,762 A | * | 6/2000 | Strasser | 296/36 |
| 6,227,608 B1 | * | 5/2001 | Hoyne | 296/183.1 |
| 6,402,223 B2 | | 6/2002 | Ser et al. | |
| 6,402,224 B1 | * | 6/2002 | Monaco et al. | 296/100.1 |
| 6,663,160 B2 | * | 12/2003 | Yarbrough et al. | 296/100.06 |
| 6,695,390 B2 | * | 2/2004 | Bucco Morello | 296/186.4 |
| 7,000,796 B2 | * | 2/2006 | Goritzka et al. | 220/263 |
| 7,125,068 B2 | * | 10/2006 | Waldorf | 296/181.1 |
| 7,458,629 B2 | * | 12/2008 | Smith et al. | 296/100.18 |
| 7,823,515 B2 | * | 11/2010 | Schaefer et al. | 105/377.02 |

(Continued)

FOREIGN PATENT DOCUMENTS

| | | |
|---|---|---|
| DE | 102007043818 B4 | 6/2009 |
| DE | 202009014277 U1 | 2/2010 |
| WO | 0048929 A1 | 8/2000 |

*Primary Examiner* — Kiran B Patel
(74) *Attorney, Agent, or Firm* — Renner Kenner Greive Bobak Taylor & Weber

(57) ABSTRACT

The vehicle according to the invention has an open-top load body defined by end walls and side walls and has a cover arrangement with which the load body is closed in a closed position and opened in an open position, the covering arrangement including at least one roof segment which is pivotable between the closed position and the open position by means of at least one pivoting mechanism. The pivoting mechanism has at least one drive shaft in the region of an upper longitudinal edge of one of the two side walls, to which drive shaft the roof segment is rigidly connected. The pivoting mechanism further includes a rack and pinion drive having a rack, the rack being in operative connection with a pinion rigidly connected to the drive shaft for the purpose of opening and closing the roof segment.

12 Claims, 6 Drawing Sheets

U.S. PATENT DOCUMENTS

| | | | |
|---|---|---|---|
| 7,967,357 B2* | 6/2011 | Kloepfer | 296/40 |
| 7,967,363 B2* | 6/2011 | Schaefer et al. | 296/100.06 |
| 8,182,045 B2* | 5/2012 | Rogers | 298/23 C |
| 8,256,355 B2* | 9/2012 | Dial et al. | 105/377.05 |
| 2002/0032986 A1* | 3/2002 | Yuge | 49/339 |
| 2006/0043755 A1* | 3/2006 | Coughtry | 296/100.1 |
| 2007/0180657 A1* | 8/2007 | Zeilbeck et al. | 16/354 |
| 2012/0024851 A1* | 2/2012 | Strasser, Sr. et al. | 220/211 |

* cited by examiner

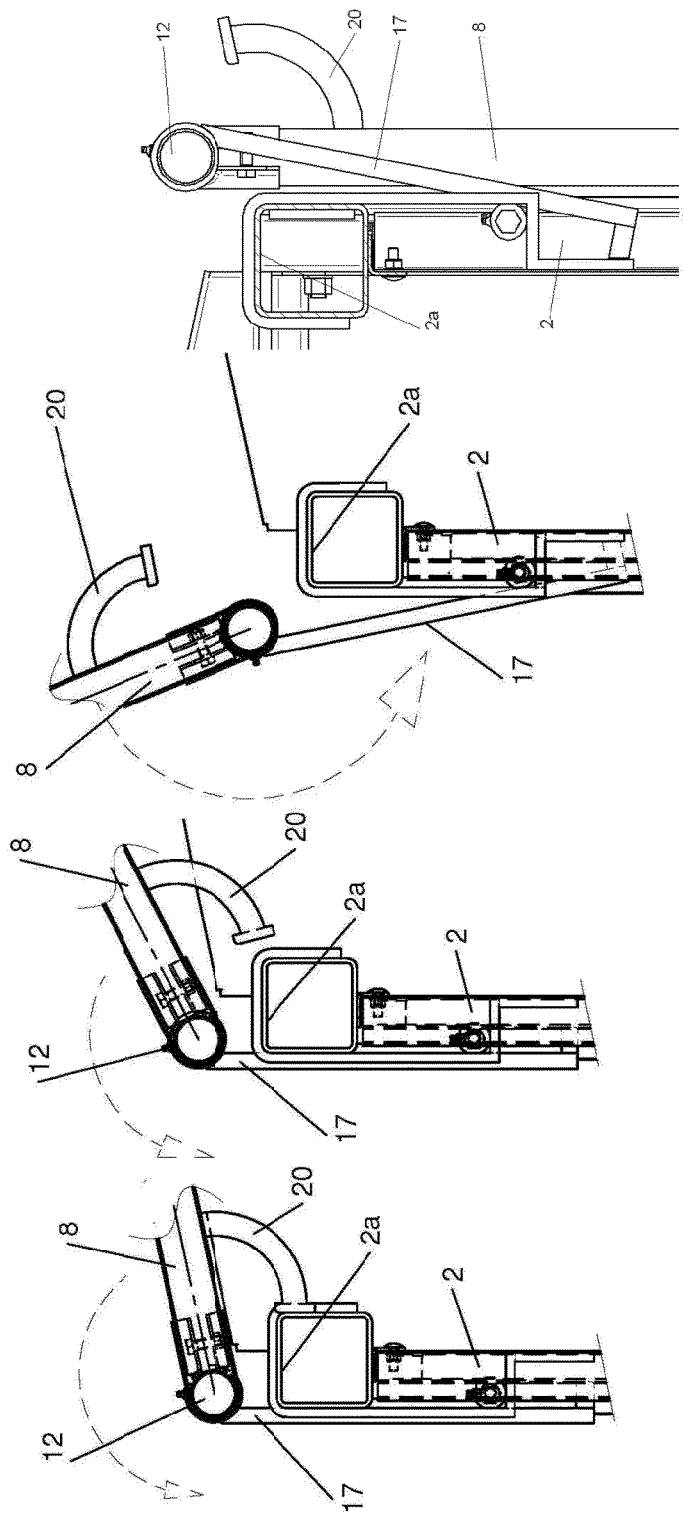

VEHICLE WITH COVER ARRANGEMENT FOR THE LOAD BODY

TECHNICAL FIELD

The invention relates to a vehicle having an open-top load body defined by end walls and side walls and having a cover arrangement that closes the load body in a closed position and opens it in an open position.

BACKGROUND OF THE INVENTION

An open-top load body is used especially for bulk goods, but also for other goods that can be loaded from above. In many cases, those goods are sensitive to moisture, however, or can easily be blown away by the relative wind produced during travel. For that reason, cover arrangements, usually formed by sliding or roll-up tarpaulins, are used in many cases. It is, however, a laborious procedure to draw such tarpaulins over the load opening, since the mechanism often jams and/or is obstructed by the load. Valuable time may be lost in that way in the case of sudden downpours or hailstorms.

U.S. Pat. No. 6,402,233 B2 describes first of all, as prior art, a cover arrangement that consists of two roof segments and that can be pivoted between a closed position and an open position, each roof segment being rigidly connected to a drive shaft in the region of the upper longitudinal edges of the side walls. The drive shafts are driven via a chain drive that is to be operated by hand. That pivoting mechanism is regarded in U.S. Pat. No. 6,402,223 B2 as being relatively cumbersome and unfavourable, however, and therefore it is proposed as an alternative that the two roof segments be operated via four link rods in each case, two link rods in each case being rigidly connected to a respective drive shaft.

A vehicle having a pivoting mechanism in accordance with the preamble of claim 1 is furthermore known from DE 10 2007 043 818 B4.

SUMMARY OF THE INVENTION

An object underlying the invention is to provide a different kind of pivoting mechanism for the cover arrangement for an open-top load body of a vehicle, which pivoting mechanism allows simple and quick operation.

In accordance with the invention, that object is attained by means of the features of claim 1.

The vehicle according to the invention has an open-top body defined by end walls and side walls and has a cover arrangement with which the load body is closed in a closed position and opened in an open position, the cover arrangement including at least one roof segment which is pivotable between the closed position and the open position by means of at least one pivoting mechanism. The pivoting mechanism has at least one drive shaft in the region of an upper longitudinal edge of one of the two side walls, to which drive shaft the roof segment is rigidly connected. The pivoting mechanism further includes a rack and pinion drive having a rack, the rack being in operative connection with a pinion rigidly connected to the drive shaft for the purpose of opening and closing the roof segment.

That pivoting mechanism allows the load body to be closed simply and quickly.

Further configurations of the invention form the subject-matter of the subordinate claims.

In accordance with a preferred illustrative embodiment, in the open position, the two roof segments are situated to the side of and next to the side walls. In the closed position, the roof segments may be arranged especially in the manner of a double-pitch roof. In that manner, a load that has been heaped to an excessive height can also be roofed over without any problem, without it being necessary for excess load to be laboriously removed by hand as would be the case with a sliding or roll-up tarpaulin. Advantageously, the two roof segment overlap in the closed position in order to afford reliable protection of the load.

The pivoting mechanism preferably has a double-acting operating cylinder for driving the rack. The rack and pinion drive is advantageously connected by its one end by means of its rack to the pinion of the drive shaft and at its other end is held in an articulated manner in the region of one of the end walls or side walls.

In accordance with a further configuration of the invention, the drive shaft is held rotatably on at least two pivoted levers, the pivoted levers pivoting away from the side wall about a common pivot axis in a limited angle range of from 5 to 30° on opening of the at least one roof segment. Owing to that construction, the drive shaft is pivoted outwards in the open position and thus enables the roof segment to be folded down parallel to the side walls. In the closed position, on the other hand, the drive shaft is drawn towards the inside. That avoids a situation where the drive shafts are disposed to the side of and outside the side walls and thereby limit the inside width of the load space since only a maximum vehicle width is permissible for on-road use.

The pivoted levers are advantageously held at the side walls in such a manner as to be pivotable about a pivot axis, the drive shaft being held at one end of the pivoted lever while the pivoted lever is supported on the side wall in a central region of the pivoted lever. The other end of the pivoted lever can then be used as a stop for the pivoting movement in the direction of the open position of the roof segment.

Further advantages and configurations of the invention will be explained in detail below with the aid of the specific description and the drawings.

BRIEF DESCRIPTION OF THE DRAWINGS

In the drawings:

FIGS. 6a-6d are detailed views of the pivoted lever/roof segment in various positions between closed position and open position of a roof segment.

DETAILED DESCRIPTION OF ILLUSTRATIVE EMBODIMENTS

Figure 1:
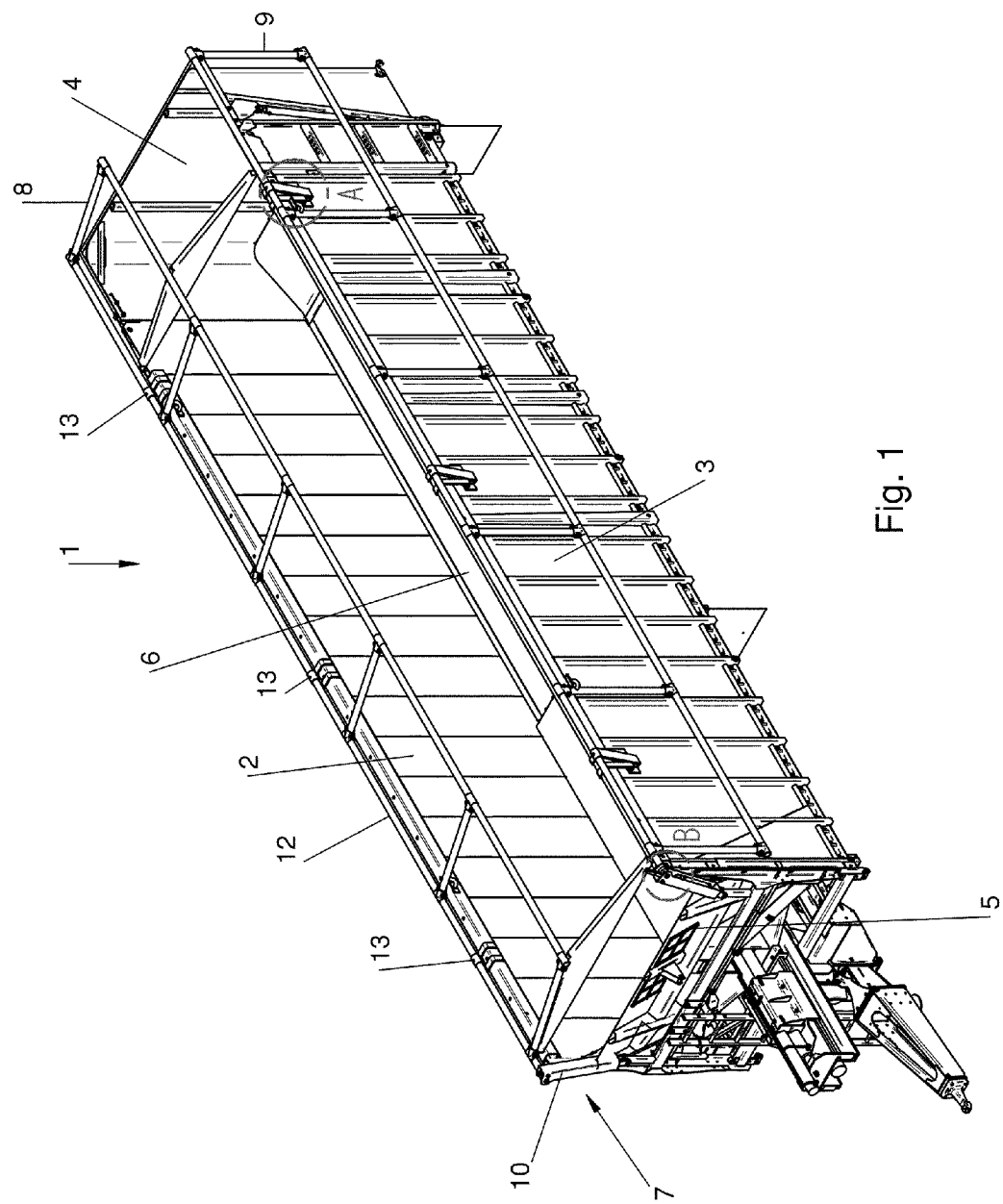
FIG. 1 is a three-dimensional illustration of the load body.
Figure 2:
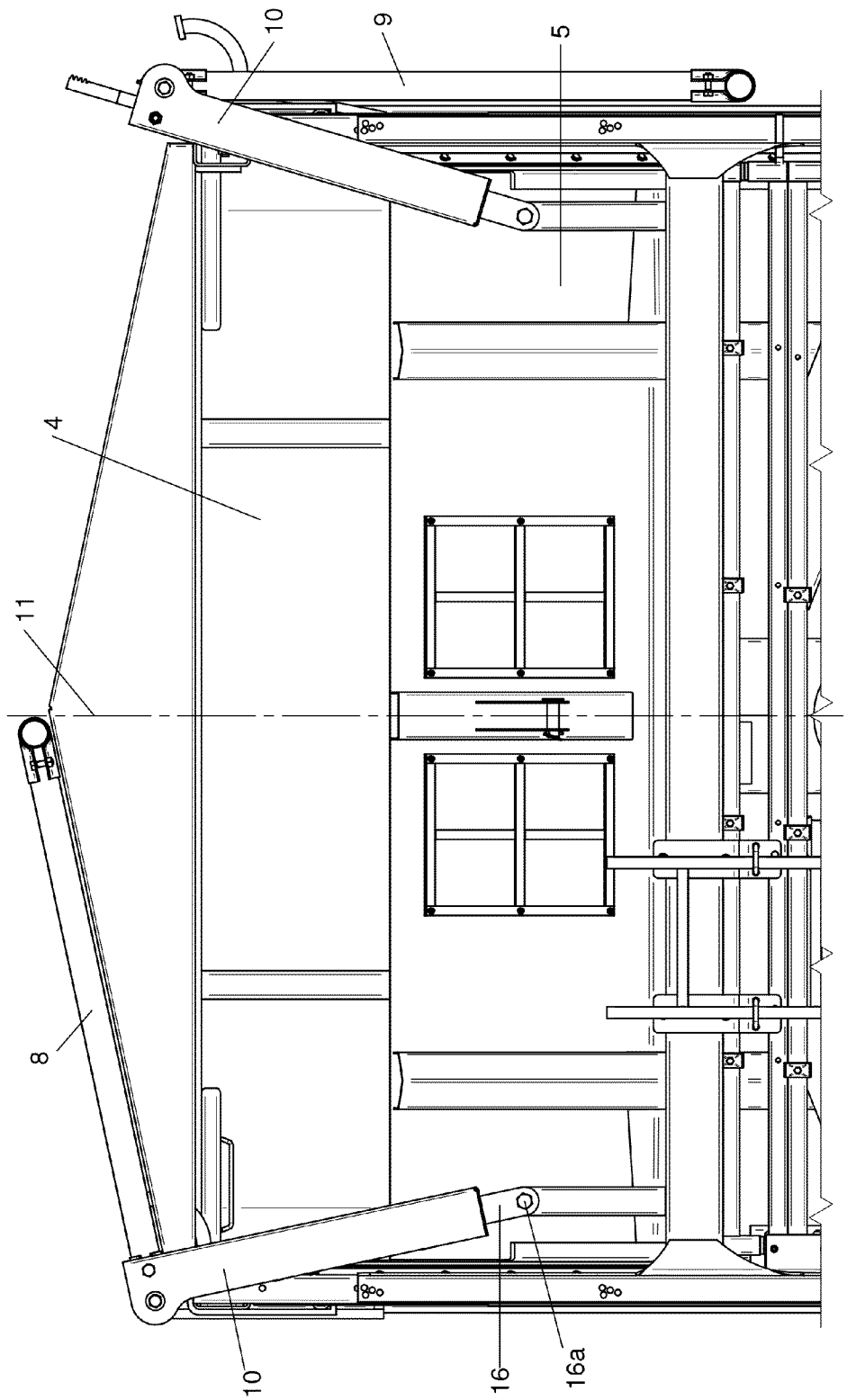
FIG. 2 is an end view of the load body, the left-hand roof segment being in the closed position and the right-hand roof segment being in the open position.

The load body illustrated in FIGS. 1 and 2 is provided on a vehicle, not shown in detail, especially a trailer or a heavy goods vehicle. It substantially consists of two side walls 2 and 3, a rear end wall 4, a front end wall 5 and a floor 6. The load body is furthermore of an open-top construction and therefore can be loaded with goods from above, for example with agricultural cut material or other goods. The front end wall 5 may, for example, be in the form of a push wall. The floor 6 may also have a push floor.

To protect the load, a cover arrangement 7 is further provided, which includes two roof segments 8, 9 and a pivoting mechanism 10. The roof segments each have a stiffened frame provided with a textile tarpaulin, not shown in detail, or with another planar, but advantageously light-weight, cover. The two roof segments 8, 9 are so arranged and constructed that in the closed position they slightly overlap in the region of the longitudinal mid-plane 11 (see FIG. 2) so that the load body is closed off in that region also in a completely rain-tight manner.

Figure 3:
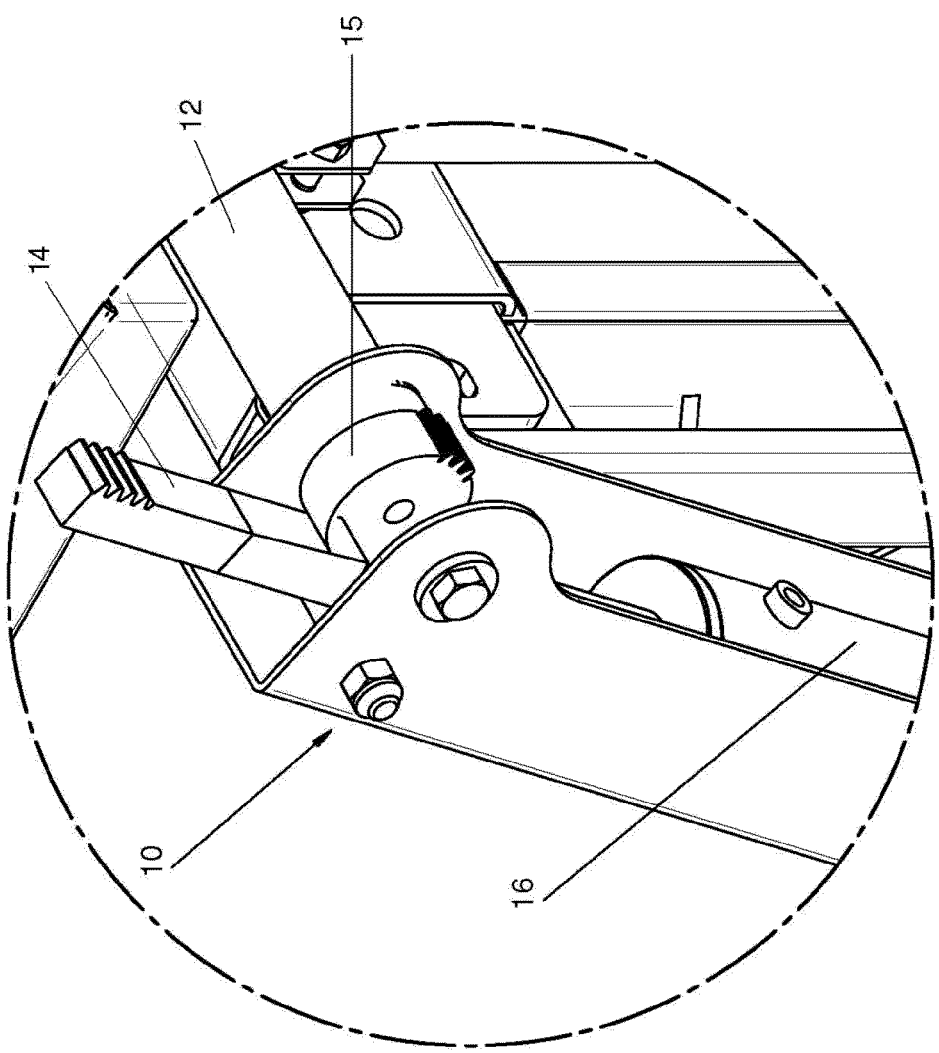
FIG. 3 is a three-dimensional detailed view of the rack and pinion drive.

Each roof segment 8, 9 is rigidly connected at its outer longitudinal edge to a drive shaft 12. The drive shaft 12 is rotatably supported in suitable bearings 13 in the region of the upper longitudinal edge of each side wall 2, 3. Each drive shaft 12 has an associated pivoting mechanism 10 comprising a rack and pinion drive having a rack 14 which is in operative connection with a pinion 15 rigidly connected to the drive shaft 12 for the purpose of opening and closing the associated roof segment (FIG. 3). Further provided is a double-acting operating cylinder 16 with which the rack 14 can be moved in both directions. The operating cylinder 16 is supported in an articulated manner at an articulation point 16a in the region of the front end wall 5. Movement of the rack 14 therefore causes rotation of the drive shaft 12 and thus an opening or closing of the associated roof segment.

Figure 4:
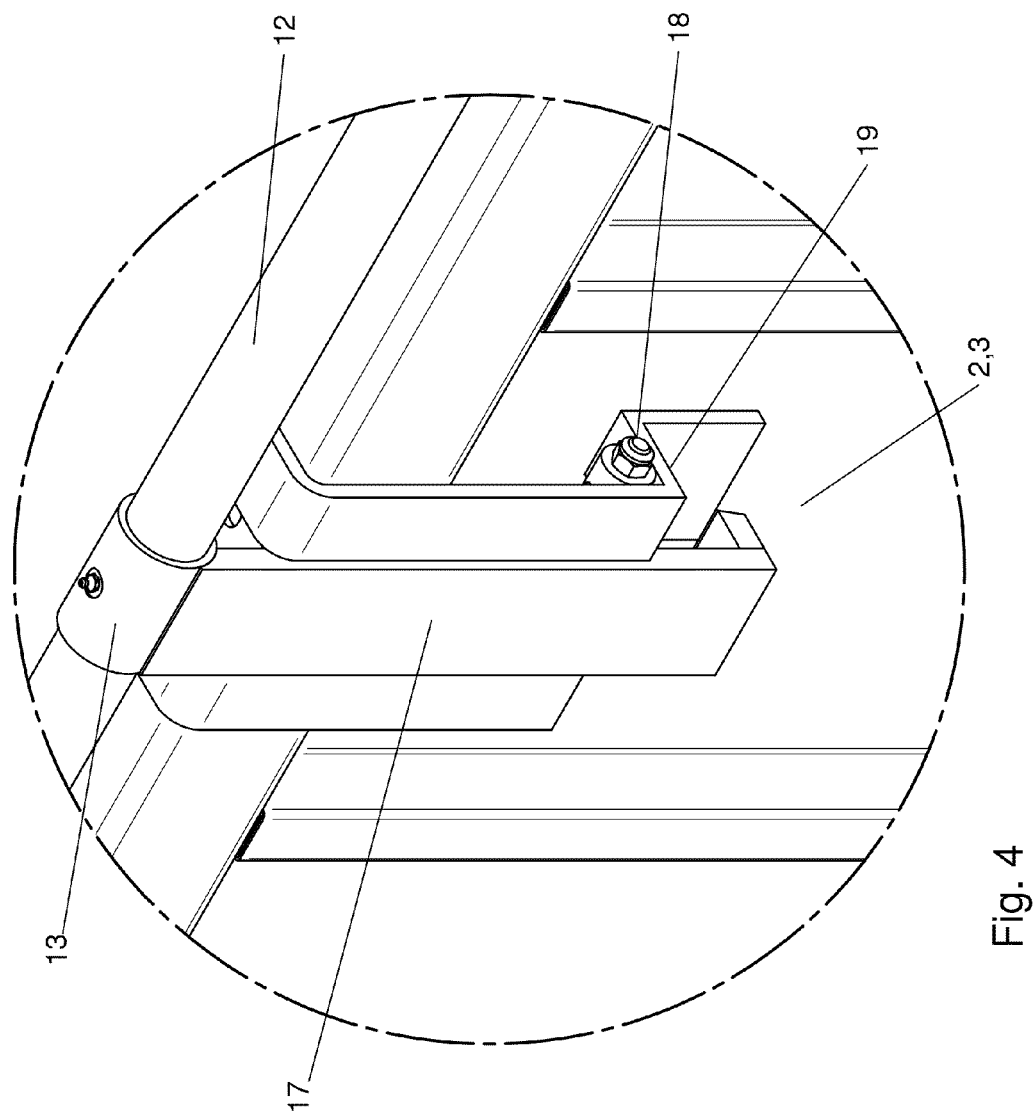
FIG. 4 is a three-dimensional detailed view of the pivoted lever in the closed position.
Figure 5:
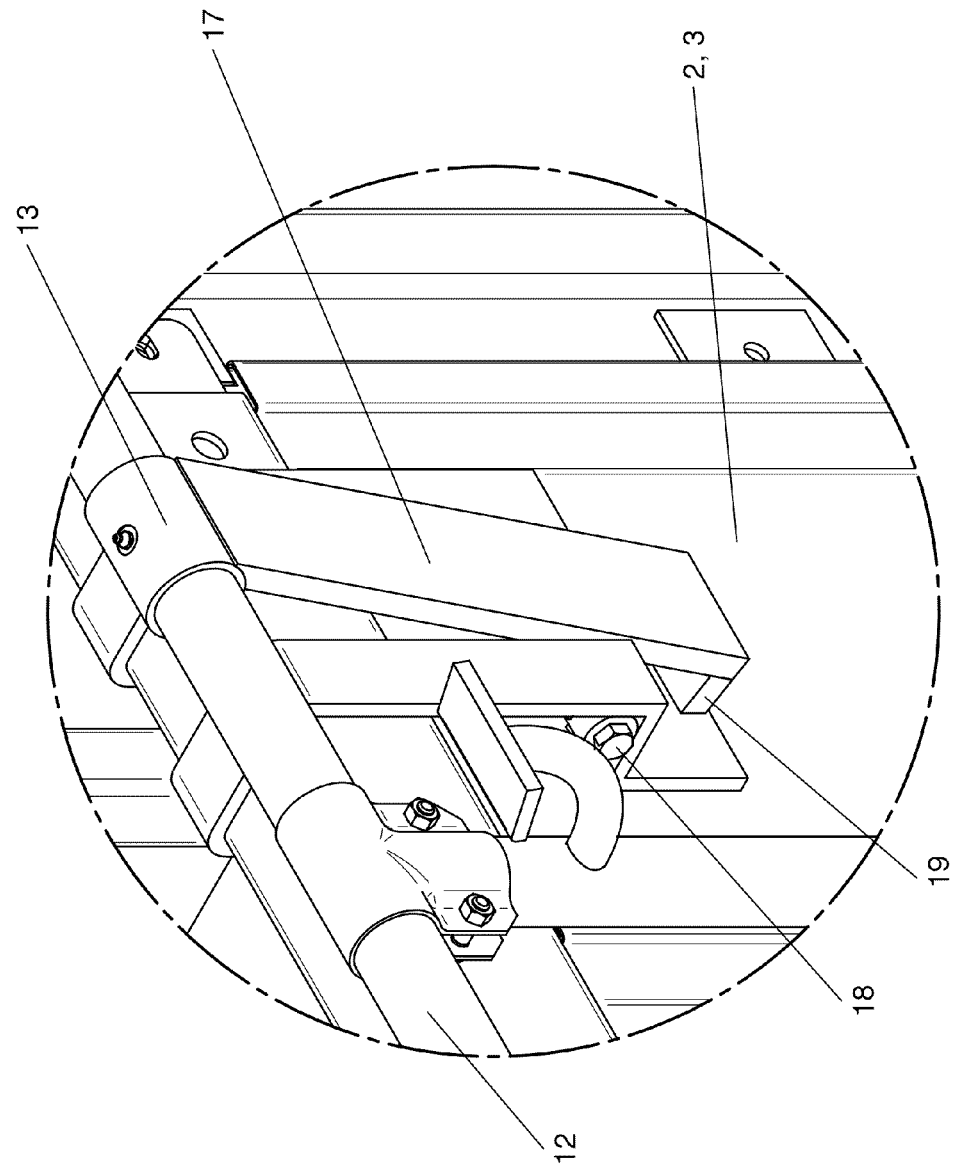
FIG. 5 is a three-dimensional detailed view of the pivoted lever in the open position.

The articulation of the operating cylinder 16 is necessary because the drive shaft 12 is not held in a fixed location in the bearings 13, but the bearings 13 are disposed on pivoted levers 17, as is apparent by reference to FIGS. 4 and 5. The pivoted levers 17 are able to pivot away from the associated side wall about a common pivot axis 18 in a limited angle range of from 5 to 30°. FIG. 4 shows the pivoted lever 17 in the closed position of the associated roof segment, whereas in FIG. 5 the outwardly pivoted position of the pivoted lever 17 in the open position of the roof segment is illustrated.

The pivoted lever 17 is supported in a central region of the pivoted lever in a suitable bearing on the side wall 2 or 3. The bearing 13 for the drive shaft 12 is held at the upper end of the pivoted lever, whereas at the other end a stop 19 is provided which, in the outwardly pivoted position of the pivoted lever 17 shown in FIG. 5, comes into contact with the side wall 2 or 3 and in that manner limits the pivoting movement.

FIGS. 6a-6d illustrate various positions between the closed position (FIG. 6a) and the open position (FIG. 6d) of the roof segment. In the closed position, the drive shaft 12 is situated exactly above an upper longitudinal edge profile-section 2a of the side wall 2 and therefore does not project laterally beyond the side wall 2. The roof segment is supported, in the closed position, on the longitudinal edge profile-section 2a by a support member 20 and thus also inhibits further movement of the roof segment 8. In the open position shown in FIG. 6d, the drive shaft 12 has been pivoted outwards by the pivoted lever 17, thus enabling the roof segment to be swung down completely. In that open position, the roof segment is approximately parallel to the corresponding side wall. In order that the operating cylinder 16 is able to follow that movement of the drive shaft, the articulation in the region of the articulation point 16a is necessary.

On being pivoted into the closed position, the pivoted lever 17 draws the associated roof segment towards the middle into the desired position of rest. Since currently a maximum vehicle width of 2550 mm must not be exceeded in on-road use, by virtue of the drive shaft 12 being pivoted it is possible to provide the load space with the maximum possible inside width and nevertheless retain the possibility of the roof segments lying flat against the side walls in the open position, thereby also allowing unproblematic loading from the side.

The invention claimed is:

1. A vehicle having an open-top load body defined by end walls and side walls and having a cover arrangement which closes the load body in a closed position and opens it in an open position, the cover arrangement including at least one roof segment that is pivotable between the closed position and the open position by means of at least one pivoting mechanism, the pivoting mechanism having at least one drive shaft in the region of an upper longitudinal edge of one of the two side walls and the roof segment being rigidly connected to the drive shaft, characterised in that the pivoting mechanism includes a rack and pinion drive having a rack, the rack being in operative connection with a pinion rigidly connected to the drive shaft for the purpose of opening and closing the roof segment.

2. A vehicle according to claim 1, characterised in that the at least one roof segment is situated, in the open position, to the side of and next to one of the two side walls.

3. A vehicle according to claim 1, characterised in that the drive shaft is held rotatably on at least two pivoted levers, the pivoted levers being pivotable away from the side wall about a common pivot axis in a limited angle range of from 5 to 30° on opening of the at least one roof segment.

4. A vehicle according to claim 3, characterised in that the pivoted levers are held on a side wall in such a manner as to be pivotable about a pivot axis.

5. A vehicle according to claim 4, characterised in that the drive shaft is held at one end of the pivoted lever and the pivoted lever is supported on the side wall in a central region of the pivoted lever.

6. A vehicle according to claim 5, characterised in that the other end of the pivoted lever serves as a stop for the pivoting movement in the direction of the open position of the roof segment.

7. A vehicle according to claim 1, characterised in that two roof segments are provided, which, in the closed position, are arranged in the manner of a double-pitch roof.

8. A vehicle according to claim 7, characterised in that the two roof segments partially overlap in the closed position.

9. A vehicle according to claim 7, characterised in that each roof segment has its own pivoting mechanism.

10. A vehicle according to claim 1, further characterised in that the at least one roof segment has a support member, which, in the closed position, comes into contact with the side wall.

11. A vehicle according to claim 1, further characterised in that the pivoting mechanism has a double-acting operating cylinder for driving the rack.

12. A vehicle according to claim 1, characterised in that, at a first end, the rack and pinion drive is connected by its rack to the pinion of the drive shaft and, at its opposite end, the rack and pinion drive is held in an articulated manner in the region of one of the end walls or side walls.

* * * * *